United States Patent [19]

Reitsma

[11] 4,139,894

[45] Feb. 13, 1979

[54] MULTI-DIGIT ARITHMETIC LOGIC CIRCUIT FOR FAST PARALLEL EXECUTION

[75] Inventor: Jogchum Reitsma, Beekbergen, Netherlands

[73] Assignee: U.S. Philips Corporation, New York, N.Y.

[21] Appl. No.: 769,414

[22] Filed: Feb. 17, 1977

[30] Foreign Application Priority Data

Feb. 23, 1976 [NL] Netherlands ............ 7601785

[51] Int. Cl.$^2$ .................................... G06F 7/50
[52] U.S. Cl. .................................... 364/788; 364/783
[58] Field of Search ............ 235/175, 174, 173; 364/788, 783

[56] References Cited

U.S. PATENT DOCUMENTS

| | | | |
|---|---|---|---|
| 3,100,835 | 8/1963 | Bedrij | 235/175 |
| 3,316,393 | 4/1967 | Ruthazer | 235/175 |
| 3,553,446 | 1/1971 | Kruy | 235/175 |
| 3,993,891 | 11/1976 | Beck et al. | 235/175 |

Primary Examiner—David H. Malzahn
Attorney, Agent, or Firm—Thomas A. Briody

[57] ABSTRACT

A simple and fast arithmetic member for multi-digit numbers. For each digit a module is provided which receives the digits of corresponding significance and which first forms two output carry signals therefrom, i.e. one as if the relevant module always receives an input carry signal (E) and one as if this module never receives an input carry signal (D). Between successive modules each time functionally identical configurations of logic elements are connected which, under the control of the input carry signal to the module (Ci) of next-lower significance, the two output carry signals (Di, Ei) thereof, and an enable signal, forms the input carry signal for the stage of next-higher significance (C(i+1)) in accordance with the formula $$C(i + 1) = Di + Ei \cdot Ci$$

3 Claims, 8 Drawing Figures

| P Q R S | Z |
|---------|---|
| 0 0 1 1 | $A + co$ |
| 0 0 0 1 | $(A \vee M') + co$ |
| 0 0 1 0 | $(A \vee M) + co$ |
| 1 1 0 0 | $A - co'$ |
| 0 1 0 0 | $(A \wedge M') - co'$ |
| 1 0 0 0 | $(A \wedge M) - co'$ |
| 1 1 1 1 | $2A + co$ |
| 1 0 1 0 | $A + M + co$ |
| 0 1 0 1 | $A + M' + co$ |
| 0 1 1 1 | $A + (A \wedge M') + co$ |
| 1 0 1 1 | $A + (A \wedge M) + co$ |
| 1 1 0 1 | $A + (A \vee M') + co$ |
| 1 1 1 0 | $A + (A \vee M) + co$ |
| 1 0 0 1 | $A + (A \oplus M') + co$ |
| 0 1 1 0 | $A + (A \oplus M) + co$ |
| 0 0 0 0 | $-co'$ |

Fig. 8

MULTI-DIGIT ARITHMETIC LOGIC CIRCUIT FOR FAST PARALLEL EXECUTION

The invention relates to a device for the parallel execution of an arithmetical operation on at least two input quantities which each consist of a plurality of digits of at least two binary signal elements each. The device comprises a sequence of at least three stages for digits of successive significance level, comprising for each stage: means for receiving each time one digit signal from each of the input quantities, an input for receiving a logic input carry signal having a predetermined number of feasible values, a result digit output, and a number of outputs for output carry signals which equals the said predetermined number, the value of an output carry signal conditionally corresponding to each time one value of the input carry signal of the relevant stage, and also comprising combinatory logic elements which are connected between two successive stages and which serve to form, on the bases of output carry signals of lower significance, a single input carry signal for the next-higher stage. A device of this kind in the form of an adder is known from U.S. Pat. No. 3,100,835, notably from FIG. 1. The known device is fast, but very complex; per stage two sum digits are formed wherefrom only one is selected by means of a gating device which conducts in only one of two feasible directions. Furthermore, the configurations of logic elements which are connected between the successive stages each time receive both output carry signals of all less-significant stages; they each time control the said gating device of the stage of next-higher significance. The configurations of logic elements have a logic depth of two gates and a logic structure which quickly becomes more complex as the significance of the relevant digits increases; this is problematic for a series connection of a large number of digit stages because, as a result of the so-called fan-in problem, no longer may all signals be applied in parallel to a single gate. In general it may be stated that the essence of the known device consists in the realization of a high speed by extensive parallelization of all functions.

The present invention, however, has for its object to provide a simple and hence cheap device. The invention has for its object to realize a completely modular device. The invention thus aims to provide a device which can be better constructed as an integrated circuit. The invention has for its object to provide fast formation of the result of the arithmetical operation, while maintaining the simplicity of the structure. The invention also has for its object to provide advantageous combination of series and parallel techniques. The invention aims to provide a device which can also be used for more than two input quantities appearing simultaneously. The invention also aims to provide a device which is also suitable for arithmetical operations other than adding. These objects are achieved in accordance with the invention in that the logic elements which are connected between two successive stages each time have identical functional configurations, each configuration, in addition to the output carry signals from and an input carry signal to the stage of next-lower significance, exclusively receiving a bivalent enable signal via an enabling line which is connected to the relevant configurations, the conditional values of the relevant output carry signals being formed under the control of a cycle control element during a first time interval, per said configuration an input carry signal for the stage of next-higher significance or the configuration of logic elements of next-higher significance being formed during a second, subsequent time interval under the exclusive control of the enable signal and with exclusion of modifications in the said conditional values. The device may be fully modular-per-digit and very fast: the transfer of a carry signal per stage need not require more than one gate delay time when there are two input quantities. The value of the said number of feasible values of the (one) input carry signal then equals two; this enables a very simple construction.

Identical functional configurations are to be understood to mean herein configurations which form corresponding output signals as based upon corresponding input signals, at least in so far such signals are relevant or feasible. The electronic configurations will then also be identical in many cases.

Each stage preferably comprises means for instantaneously generating only a single result digit. This results in an attractive, further simplification in comparison with the known device; because therein each time two sum digits are formed, so that each time two devices are required. Per stage each time only one sum digit is required for later use.

An attractive simplification is also achieved in that the means for forming the said conditional values form part of the means for forming the result digits. Effective synchronization can be achieved in that the enabling line comprises a control conductor which is common to all configurations. The speed is increased by suitable use of wired gate functions, notably because the said configurations comprise a single discrete gate between their input for the input carry signal of next-lower significance and the output for the output carry signal to be formed.

The invention will be described in detail hereinafter with reference to the accompanying diagrammatic drawings.

FIG. 8 shows the functions to be implemented by stages of this kind.

Figure 1:
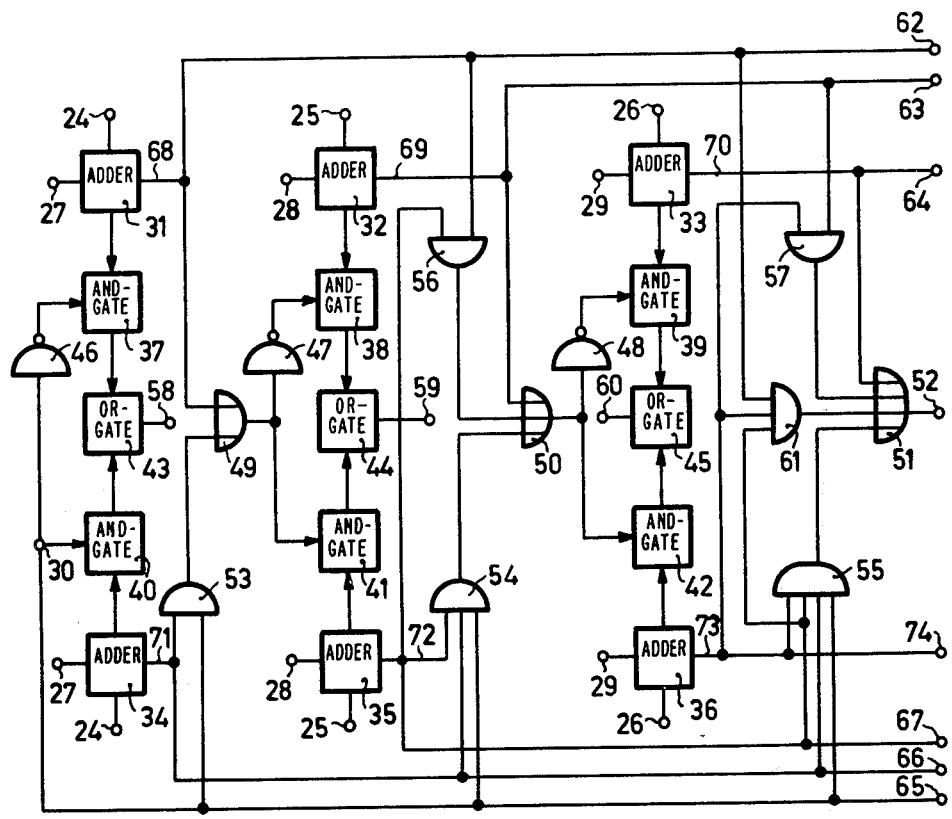
FIG. 1 shows a device in accordance with the known technique.

FIG. 1 shows a device in accordance with the said U.S. Pat. No. 3,100,835 for the three least-significant digits of two numbers to be added. The device comprises adders 31 ... 36, multiple AND-gates 37 ... 42, multiple OR-gates 43 ... 45, AND-gates 53 ... 57, 61, OR-gates 49 ... 51 and inverters 46 ... 48. The two input numbers in this case consist, for example, of digits of five bits. The digits arrive on the inputs 24, 25, 26 and 27, 28, 29, respectively which are all constructed to be double. A binary input carry signal arrives on the terminal 30. The adders 31, 32, 33 operate as if the relevant stage never receives an input carry signal. The adders 34, 35, 36 operate as if the relevant stage always receives an input carry signal. Always one of the two sums thus formed per digit stage is conducted under the control of the input carry signals on the input 30 and the output signals of the logic OR-gates 49, 50, 51, respectively, or the inverted values thereof on the outputs of the inverters 46, 47, 48. The elements 37, 38 . . . 42 can operate as a blocking element for a five-bit signal which is received in parallel from the adders 31, 32 . . . 36. The elements 43, 44, 45 operate as a quintuple logic OR-gate, so that the output signals appear on the outputs 58, 59, 60. The output carry signals of the adders appear on the outputs 68, 69, . . . 73.

An input carry signal on the terminal 30 having the value "1" unblocks the element 40 and the sum on the output 58 is then based on an input carry signal "1" on the terminal 30. The signal on the terminal 30 is referred to as Do. If Do = 0, the element 37 is unblocked and the sum on the output 58 is based on the absence of an input carry signal on the terminal 30. As regards the second stage, the signal on the line 68 has the same effect as the signal on the terminal 30 as regards the first stage; it is denoted by the reference D1, and controls the element 41 via the OR-gate 49. If the signal on the line 71 is logic "1" (E1=1) and the signal on the terminal 30 is logic "1", the element 41 is also driven. In all other cases the element 38 is driven. If the signal of the gate 49 is referred to as C1, the following is applicable: C1 = D1 + E1·D0, and similarly:

$$Co = Do$$

In this respect a plus sign denotes the logic OR-function, while a dot denotes the logic AND-function. The signal on the line 69 is referred to as D2, that on the line 72 as E2, and that of the gate 50 as C2. In that case: C2 = D2 + E2·D1 + E2·E1·Do. Similarly, for the signal of gate 51: C3 = D3 + E3·D2 + E3·E2·D1 + E3·E2·E1·D0. The output lines 52, 62, 63, 64, 65, 66, 67 and 74 then carry the signals C3, E1, E2, E3, Do, D1, D2, D3, respectively, which can be applied to a stage of next-higher and subsequent significance. The processing time comprises first of all the adding time Ta required by the units 31–36. For the formation of the signals Di and Ei, always the time Ta is required and sufficient. For the formation of the sum digits, five further gate delay times in series are required, for example, by the series of gates 53, 49, 47, 38, 44. Consequently, the device is very complex because of two adders and three multiple gates per stage, and furthermore because of the configurations of logic gates which are connected between the stages and which become more complex as the significance increases. Therefore, these configurations will certainly not be modular.

Figure 2:
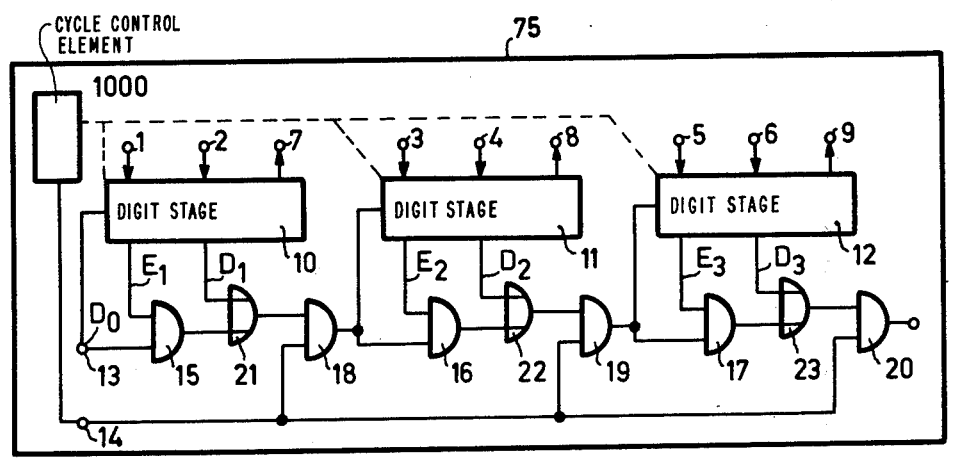
FIG. 2 shows a device in accordance with the invention.

FIG. 2 shows the device 75 in accordance with the invention, which also serves for the addition of two numbers of three digits each. The figure first of all shows a cycle control element 1000. Also shown are three digit stages 10, 11, 12, six logic AND-gates 15 . . . 20 and three logic OR-gates 21 . . . 23. The digits of the input quantities can be received on the inputs 1, 3, 5 and 2, 4, 6 respectively. An input carry signal Do can be received on the terminal 13. The input information can be received from devices which are normally present in the periphery of a computer, for example, registers or other elements producing information; these elements are not shown for the sake of simplicity. The production or the input can be controlled by the element 1000 along of control lines not shown. The element 1000 can be embodied, for example, in the output register of a control store. An element of this kind also supplies, possibly under co-control by a clock not shown, an enable signal on the input 14. During a first time interval, the element 1000 controls the elements 10, 11, 12 along the control line denoted by a broken line. The element 10 then forms, from the input digits received on the terminals 1, 2, the conditional values of the output carry signals D1, E1 which have the significance described with reference to FIG. 1. The formation of the signals D, E will be described in detail hereinafter. Similarly, the other conditional output carry signals D2, D3, E2, E3 are determined in the elements 11 and 12. The time required for generating the signals D, E is determined by the known properties of the elements 10, 11, 12. When all signals D have been formed and the output signals on the output lines of the OR-gates 21, 22, 23 are stable 0 or 1, respectively, which lasts for a given predetermined period of time, the enable signal is generated on the line 14 by the control element 1000. As a result, the AND-gates 18, 19, 20 can conduct. Regardless of the method of generating the signals D, E (see also hereinafter), there are only two possibilities: (a) the signal Di = 1, so that the relevant OR-gate supplies a "1" signal which is no longer influenced by any modifications of the signal Ei; b) if the signal Di = 0. the OR-gate supplies a logic "0" which can possibly change to a logic "1", provided that the value of the signal Ei is logic "1"; due to the absence of the enable signal (outputs of the gates 18, 19, 20), this value was ineffective for the time being. When the enable signal appears, the gates 18, 19, 20 become conductive and the output carry signal of a stage is transferred, each time after three gate delay times per stage, to the configuration of logic elements between the subsequent two stages, the formation of the ultimate sum signals not representing a further restriction. In the embodiment shown, the delay amounts to three gate delay times per stage. When the sum is determined, the output carry need not be determined again. If the value of Ei were to change under the influence of a change of the value of the input carry signal to the relevant stage (i.e. from 0 to 1, because the circuit for forming the signal Ei forms part of the circuit for forming the sum digit), this would have no effect on the output signal of gate 21, because the signal Di is then already logic "1".

Figure 3:
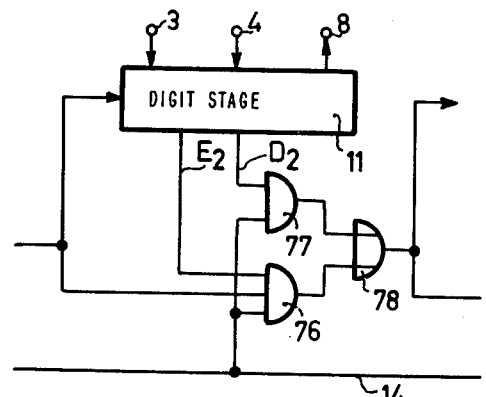
FIG. 3 shows a second device in accordance with the invention.

At the element 11 of FIG. 2, FIG. 3 shows a different configuration of logic elements per stage with logic AND-gates 76, 77 and a logic OR-gate 78, only two gates (76, 78) being connected in series. The function formed is for the remainder identical to that of FIG. 2. In given technologies, the OR-gate 78 can be constructed as a wired-OR-gate by interconnecting the outputs of the AND-gates 76 and 77. In that case only one gate delay time per stage is required.

The circuit shown in FIG. 2 can be used in different manners. The input digits may be coded to be fully binary and may comprise four bits, so that a hexadecimal code is present. They may alternatively be binary-decimal (BCD) or octal coded digits. They can also be arbitrarily coded. Other operations are also possible. For example, subtractions can be performed, not only by way of the method involving the adding of the complement, but also directly, for example, in that on the outputs D and E borrow signals occur which correspond to the cases where never and always, respectively, an input borrow signal occurs from the stage of next-lower significance. Under the control of the enable signal, they are quickly passed on with one or a few gate delay times per digit stage. In this case the stages 10, 11, 12 are selectively controlled along lines which are not described with reference to these Figures but rather with reference to the FIGS. 6–8. These lines may originate from the element 1000 or another control element.

Figure 4:
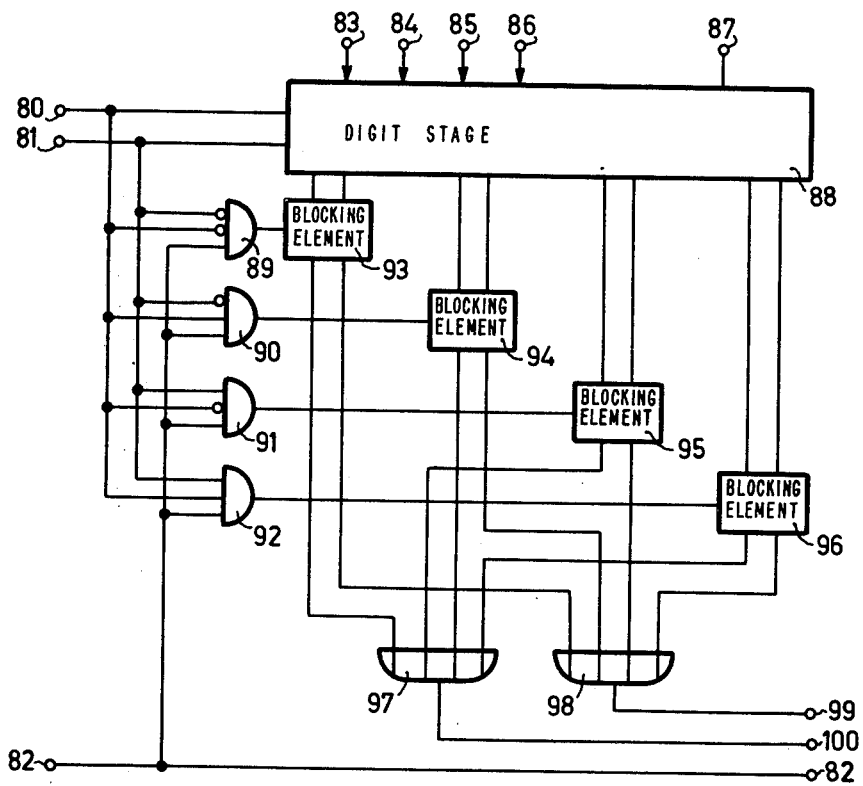
FIG. 4 shows a third device in accordance with the invention.

FIG. 4 shows a further device in accordance with the invention, notably for use in a four-input arithmetic member. Only one digit stage is shown. The input digits are assumed to be hexadecimal digits; they appear on the four inputs 83, 84, 85, 86. If there is no input carry signal and the sum is between 0 and 15 inclusive, the output carry signal is 00; if the sum is between 16 and 31 inclusive the carry is 01; if the sum is between 32 and 47 inclusive, the carry is 10, and if the sum is still higher, the carry is 11. The input carry can have the same four values, so for all possibilities for the input carry the conditional value of the output carry is determined (simultaneously or sequentially), these relevant values, being mutually different or not, being applied to the blocking elements 93, 94, 95, 96 which are still driven to block by the output signals of the gates 89 . . . 92. If the sum is, for example, equal to 30, the conditional output carries are 01, 01, 10, 10, respectively. If the four output carry signals to be formed are stable, which is the case after a predetermined period of time, an enable signal appears on the line 82 which is applied to the logic AND-gates 89 . . . 92 which also receive the input carry signals from the terminals 80, 81. Under the control of the enable signal on the terminal 82, one of the AND-gates 89 . . . 92 supplies a logic "1" signal, because they receive, in the manner of the decoder, all (4) combinations of the logic input carry signals via inverting inputs which are denoted by circles. For example, if the input carry signal is 0,0, the blocking element 93 starts to conduct. The input signals thereof produce exactly the output carry signals per stage if the input carry signals were 0,0, and this is similarly applicable to the blocking elements 94, 95, 96. Via the bit-wise operating OR-gates 97, 98, the output carry signals appear on the terminals 99, 100 in order to be applied to a digit stage of next-higher significance level. The terminal line 82 is also connected to the other stages (not shown) of lower or higher significance. For a three-input arithmetic member, the highest value of the carry output signal is 10 (the value 11 does not occur in this respect) and in that case the elements 92, 96 can be dispensed with, like the terminal 86, of course. Arithmetic members comprising three inputs are known per se, so that the formation of the digit sums is not elaborated herein.

During the second part of the operation, i.e. after the formation of the conditional values of the carry signals, the terminal 87 serves for the supply of the result digit to a user device.

Figure 5:
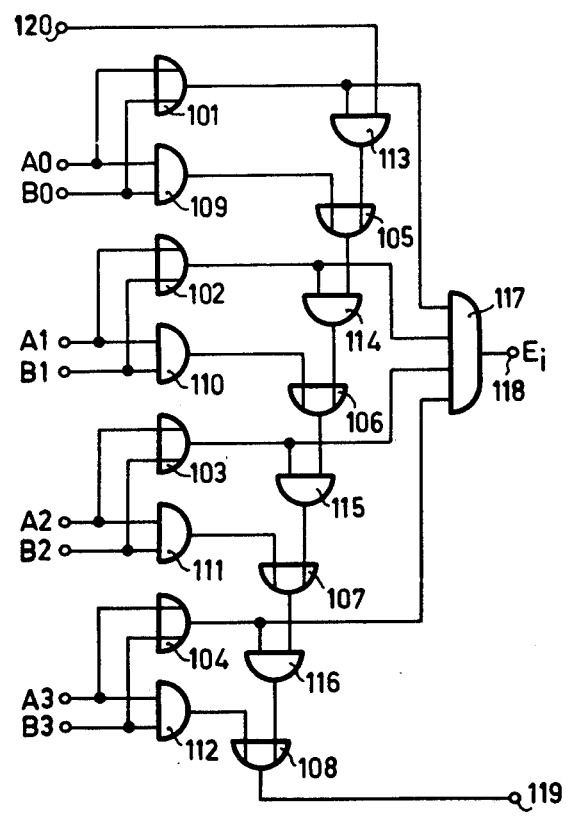
FIG. 5 shows a circuit for forming the signals "D" and "E".

FIG. 5 shows a device as shown in FIGS. 2, 3, which comprises a circuit for determining the (one-bit) signals Di and Ei per digit stage. The circuit comprises logic AND-gates 109 . . . 117, and logic OR-gates 101 . . . 108, and is suitable for hexadecimal coded digits comprising four bits. The significance increases from the inputs Ao, Bo to the inputs A3, B3. The input carry signal can be received on the input 120. If both bits Ao, Bo are logic "1" and each time at least one of all pairs of input bits of higher significance equals "1", a logic "1" reaches the output 119 via the network 105, 114, 106, 115, 107, 116, 108. This is the signal Di. The same is applicable if, for example, the bits A2 and B2 are both "1" and either the bit A3 or the bit B3 or both bits equal "1". Irrespective of the input carry signal, an output carry signal can thus appear if the sum of the two input digits at least equals 16; thus, the signal Di appears on the terminal 119. Conversely, if this signal appears, the sum also at least equals 16. If furthermore each time at least one input of each pair of inputs Aj, Bj carries a logic "1", all OR-gates 101 . . . 104, and hence the logic AND-gate 117, supply a logic "1": the sum of the input digits then at least equals 15, and hence the value of Ei = 1 (output 118). If the value of Ei = 1 in this case, the sum also equals at least 15. However, if the value of Ei is 0, two possibilities exist:

(a) the sum is smaller than 15, in which case Di = Ei = 0;

(b) the sum exceeds 15, for example 1000 (8) = 1000 (8) = 0000 + carry output signal, but in this case the value of Di always equals 1. The "true" value of Ei (sum >14) can then be found by combining the outputs 118, 119 by way of an OR-function. This is realized in the circuits shown in FIGS. 2, 3 by way of the gates 21, 22, 23, 78, so that it is not absolutely necessary in the circuit shown in FIG. 5. The input carry signal on the terminal 120 has the same significance as the bit signals Ao, Bo, so that the true value of the output carry signal can also be formed on the output 119; obviously a circumstance which has been changed as a result of this supply becomes manifest exclusively in the signal Di on the terminal 119, because the signal on the terminal 118 is determined exclusively by the input digits. The circuit shown in FIG. 5 can similarly be expanded for an arbitrary number of bits. If the connection between terminals 120 and 119 is not necessary, the gates 105 and 113 can be dispensed with and the delay time amounts to seven gate delay times, for example, through the network 109, 114, 106, 115, 107, 116, 108.

Figure 6:
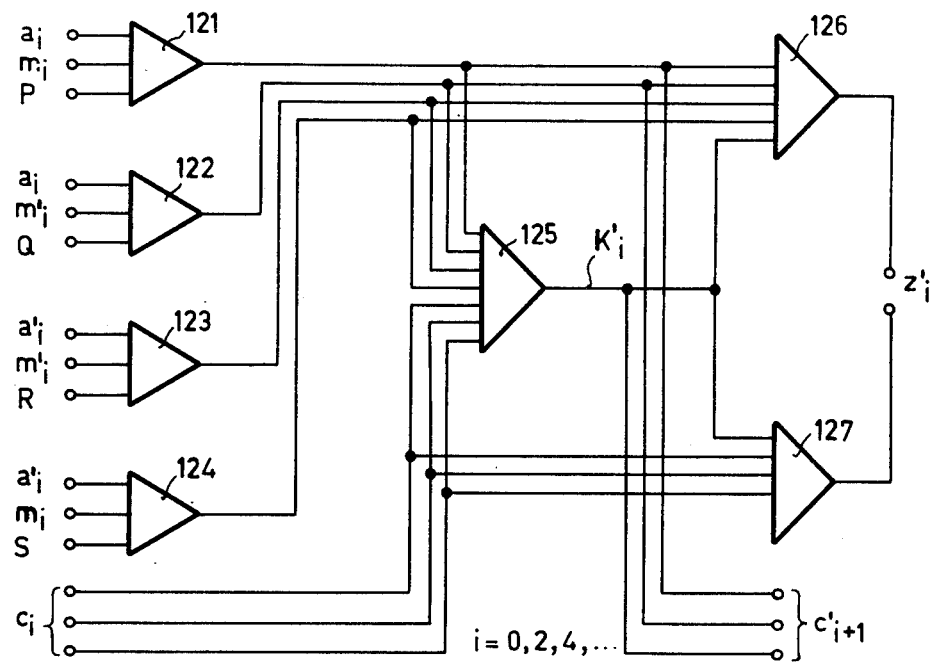
FIGS. 6 and 7 show the construction of two successive digit stages of an embodiment in accordance with the invention.
Figure 7:
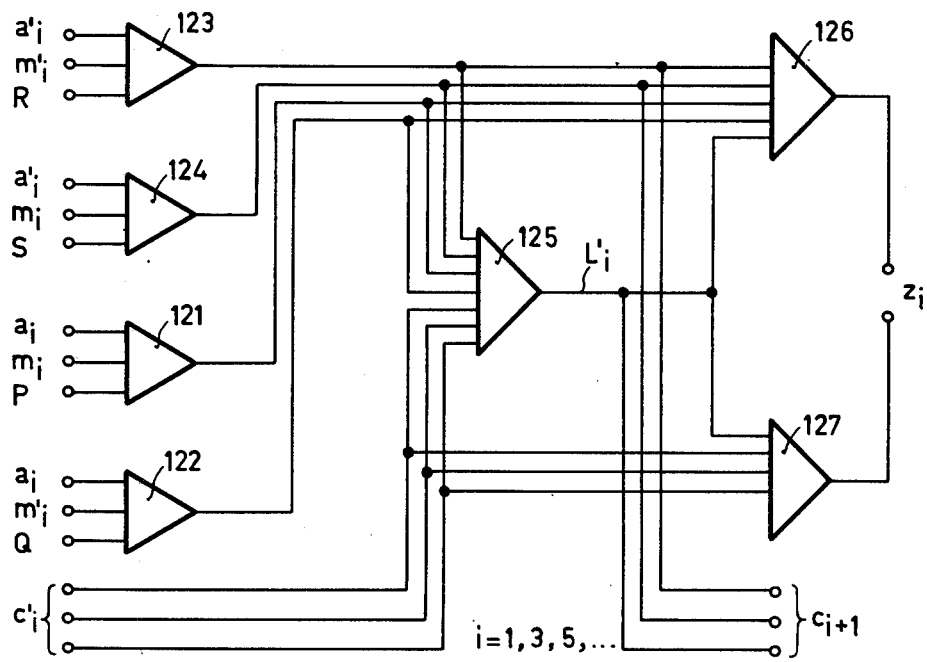

FIGS. 6 and 7 show examples of circuits for the odd and even bit positions, respectively, of a digit stage. The circuits are composed exclusively of NAND-gates, i.e. an input stage comprising the NAND-gates 121 . . . 125, an intermediate stage comprising the further NAND-gate 125, and an output stage comprising the output NAND-gates 126 . . . 127. Hereinafter, ai and mi are the bits on the $i^{th}$ bit position of two numbers A and M (for example, hexadecimal coded digits) on which an operation must be performed, and zi is the bit on the $i^{th}$ position of the result Z of the operation. Furthermore, ci is the input carry signal for the bit circuit and $c(i+1)$ is the output carry signal thereof, Ki and Li being auxiliary signals.

The four NAND-gates of the input stage receive the signals ai, mi, P; ai, mi', Q; ai', mi', R; and ai', mi, S, respectively, wherein P, Q, R and S are four control signals and an accent denotes the inverted value. The NAND-gates 121 and 122 together form a first auxiliary signal, and the NAND-gates 123 and 124 together form a second auxiliary signal. The input carry signal ci, or ci', is formed by signals received via three conductors in parallel connection. In the circuit shown in FIG. 6, the intermediate stage, consisting of a further NAND-gate 125, receives the first and the second auxiliary signal and the signal ci, and forms the auxiliary signal Ki' therefrom, while the intermediate stage in the circuit shown in FIG. 7, consisting of a further NAND-gate 125, receives the first and the second auxiliary signal and the signal ci' and forms the auxiliary signal Li' therefrom. In the circuit shown in FIG. 6, the first output NAND-gate 126 receives the first and the second auxiliary signal and the signal Ki', whilst in FIG. 7 it receives the first and the second auxiliary signal and the signal Li'. The output NAND-gate 127 in the circuit shown in FIG. 6 receives the signals $K_i'$ and $c_i$, and in the circuit shown in FIG. 7 it receives the signals $L_i'$ and $c_i'$. The output NAND-gates 126 and 127 supply two signals which together form the signal $z_i'$ in the circuit shown in FIG. 6 and the signal $z_i$ in the circuit shown in FIG. 7. In the circuit shown in FIG. 6, the first auxiliary signal and the signal $K_i'$ together form the signal $c(i+1)'$, whilst in the circuit shown in FIG. 7 the second auxiliary signal and the signal $L_i'$ together form the signal $c(i+1)$.

The circuits shown in the FIGS. 6 and 7 can perform different operations on the digits of the numbers A and M in dependence of the values of the control signals P, Q, R and S. For example, it appears from the table of FIG. 8 that these circuits operate as a binary integer adder if the control signals P, Q, R and S have the value 1, 0, 1 and 0, respectively.

A particular aspect of the circuit consists in that the quantity $z_i$ or the complement $z_i'$ is not supplied in the form of a single bivalent signal identified thereby, but rather in the form of a combination of two bivalent signals $z_i'$ (FIG. 6) or $z_i$ (FIG. 7) which, when applied to a NAND-gate, are equivalent to the quantity $z_i$ or $z_i'$ on the output thereof.

Similar remarks are applicable to the combinations of each time two or more signals $c_i$ an $c(i+1)$ which are identified by the quantities $c_i$ and $c(i+1)$.

A further particular aspect consists in that the circuit shown in FIG. 6 must receive the signal $c_i$ and supplies the signals $z_i'$ and $c(i+1)'$, whilst the circuit shown in FIG. 7 must receive the signal $c_i'$ and supplies the signals $z_i$ and $c(i+1)$. The circuits shown in FIGS. 6 and 7 (being actually identical except for the interchanges or negations of the ingoing and outgoing signals) must thus alternate for the successive execution of an operation on signals which are identified by a digit of an even and an odd digit position.

The feasible operations which can be executed by means of the device shown in the FIGS. 6 and 7 are shown in the table of FIG. 8. The different combinations of values for the control signals P, Q, R and S are stated. The meaningful operation results Z thus formed are represented in general form by numbers A and M and the carry is represented by co. In this table the signs which are often used in the computer technique have the following meaning:
+ arithmetical addition
− arithmetical subtraction
∧ conjunction ("and") (per bit)
∨ disjunction ("or") (per bit)
> negation (per bit)
⊕ antivalence or modulo-2 (per bit).

Another advantageous aspect of the circuit shown in FIGS. 6 and 7 consists in that only a single gate delay time exists between the input carry signal and the output carry signal; for a hexadecimal digit stage this means a series connection of alternately a circuit as shown in FIG. 6 and a circuit as shown in FIG. 7, up to a total delay time of four gate delay times. Thus, in accordance with the foregoing, the delay in a digit stage may remain limited to approximately four gates, in combination with a delay time between successive digit stages of only one gate delay time. Thus, the circuit is much simpler and hardly slower than the said state of the art. The application of gates other than NAND-gates is in keeping with it.

What is claimed is:

1. A device for parallel execution of an arithmetical operation on at least two input quantities, each input quantity comprising a sequence of at least three digits having corresponding successive significance levels, each of said digits comprising a sequence of at least two binary signals, comprising:
a plurality of stages ordered in series according to the respective significance level of said digits, the lowest ordered stage in series corresponding to the least significant digit, the highest ordered stage in series corresponding to the most significant digit, each of said stages comprising: an input for receiving signals representing each of said input digits of corresponding significance level; an input for an input carry signal; a plurality of outputs for output carry signals; means for generating all possible output carry signals on said outputs depending upon said input digits received and said input carry signal; and means for generating and transmitting a signal representing a result digit based upon said input digits received and upon the prevailing input carry signal;
a cycle control element connected to each of said stages and operative for driving said means for generating all possible output carry signals in each of said stages in a first time interval upon reception of said input digits, the value of each of said output carry signals depending upon the value of the input carry signal and said input digits received by the respective stage;
combinational gating means connected to each of said stages for transferring the respective output carry signal of each of said stages to the successive higher one of said stages at a predetermined time, said combinational gating means including a plurality of gating circuits each associated with a respective one of said stages, each of said gating circuits having a plurality of inputs, each one of said inputs being exclusively connected to one of said ouputs of said respective one stage; a single output connected to said input for an input carry signal of the successive one of said stages of next higher significance level for transmitting an input carry signal thereto; and carry signal input means for receiving said input carry signal from said gating circuit corresponding to the successive one of said stages of next lower significance level;
an enabling line connected from said cycle control element to each of said gating circuits;
said cycle control element being operative for generating an enabling signal on said enabling line in a subsequent second time interval for activating said single output of each of said gating circuits for transmitting a carry signal therethrough under exclusive control of said input carry signal from said gating circuit corresponding to the successive one of said stages of next lower significance level.

2. A device as claimed in claim 1, wherein said enabling line comprises a single conductor common to each of said gating circuits.

3. A device as claimed in claim 1, wherein each of said gating circuits comprises a delay-introducing discrete gate between the input for the input carry signal of next-lower significance level and the output for said output carry signal to be formed.

* * * * *